(12) United States Patent
Vitt et al.

(10) Patent No.: US 10,760,426 B2
(45) Date of Patent: Sep. 1, 2020

(54) TURBINE ENGINE WITH VARIABLE EFFECTIVE THROAT

(71) Applicant: General Electric Company, Schenectady, NY (US)

(72) Inventors: Paul Hadley Vitt, Liberty Township, OH (US); Brian David Keith, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 356 days.

(21) Appl. No.: 15/621,123

(22) Filed: Jun. 13, 2017

(65) Prior Publication Data
US 2018/0355738 A1    Dec. 13, 2018

(51) Int. Cl.
*F01D 5/14*     (2006.01)
*F01D 9/06*     (2006.01)
*F01D 17/14*    (2006.01)

(52) U.S. Cl.
CPC ............. *F01D 5/145* (2013.01); *F01D 9/065* (2013.01); *F01D 17/14* (2013.01); *F05D 2240/122* (2013.01); *F05D 2240/124* (2013.01); *F05D 2270/17* (2013.01)

(58) Field of Classification Search
CPC .......... F01D 5/145; F01D 17/14; F01D 9/065; F05D 2270/17; F05D 2240/124; F05D 2240/122
See application file for complete search history.

(56) References Cited

U.S. PATENT DOCUMENTS

| | | | |
|---|---|---|---|
| 4,526,512 A | 7/1985 | Hook | |
| 4,624,104 A * | 11/1986 | Stroem | F01D 5/148 415/115 |
| 5,207,556 A * | 5/1993 | Frederick | F01D 5/189 415/115 |
| 5,799,874 A | 9/1998 | Eigenbrode et al. | |
| 5,931,636 A | 8/1999 | Savage et al. | |
| 7,775,460 B2 | 8/2010 | Berg et al. | |
| 7,802,760 B2 | 9/2010 | Webster | |
| 8,052,388 B2 | 11/2011 | McCaffrey et al. | |
| 8,197,209 B2 * | 6/2012 | Wagner | F01D 5/145 415/914 |
| 8,402,744 B2 | 3/2013 | Schirtzinger | |
| 8,650,854 B2 | 2/2014 | Migliaro, Jr. et al. | |
| 9,273,566 B2 | 3/2016 | Spangler et al. | |

(Continued)

FOREIGN PATENT DOCUMENTS

| | | |
|---|---|---|
| CN | 106368821 A | 2/2017 |
| CN | 106468181 A | 3/2017 |
| EP | 2072756 A2 | 6/2009 |

OTHER PUBLICATIONS

Chinese Patent Office, Office Action re Corresponding Application No. 201810607604.0, Jun. 3, 2020, 8 pages, China.

*Primary Examiner* — Joseph J Dallo
*Assistant Examiner* — Kurt Philip Liethen
(74) *Attorney, Agent, or Firm* — McGarry Bair PC (57) ABSTRACT

An apparatus and method for controlling a flow of fluid through a nozzle assembly including a set of nozzles. The nozzles can have a set of airfoils defining a throat between the airfoils. One or more exhaust holes can be provided in the airfoils downstream of the throat. A fluid supply line can be fluidly coupled to the exhaust holes for selectively supplying a flow of fluid through the exhaust holes.

26 Claims, 6 Drawing Sheets

(56) References Cited

U.S. PATENT DOCUMENTS

| | | |
|---|---|---|
| 9,403,600 B2 | 8/2016 | Leland et al. |
| 9,995,314 B2 | 6/2018 | Miller et al. |
| 10,280,757 B2* | 5/2019 | Kupratis ................ F01D 5/146 |
| 2008/0056907 A1* | 3/2008 | Heyward ................ F01D 9/041 |
| | | 416/96 R |
| 2009/0016871 A1* | 1/2009 | McCaffrey ............. F01D 5/145 |
| | | 415/115 |
| 2015/0226232 A1 | 8/2015 | Duong et al. |
| 2017/0051680 A1 | 2/2017 | Becker, Jr. et al. |
| 2018/0340468 A1* | 11/2018 | Takamura ............... F01D 11/24 |

* cited by examiner

TURBINE ENGINE WITH VARIABLE EFFECTIVE THROAT

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines have a compressor section for compressing a volume of air entering the engine, a combustor section for combusting a material to accelerate the air passing through the engine, and a turbine section driven by the accelerated air to drive the compressor section, and generating thrust. A nozzle is formed at a first stage of the turbine section downstream of the combustion section, as the smallest cross-sectional distance of the engine. The engine performance is limited by the nozzle. As such, sizing of the nozzle is important in determining engine efficiency and thrust, which needs to be balanced in sizing the nozzle.

BRIEF DESCRIPTION OF THE INVENTION

In one aspect, the disclosure relates to a turbine engine including a compressor section and a combustion section in axial flow arrangement and defining an engine centerline. A nozzle assembly is downstream of the combustion section and includes a set of airfoils circumferentially arranged around the engine centerline with a throat defined between adjacent airfoils. At least one of the airfoils has an interior passage and a set of exhaust holes from the interior passage positioned downstream of the throat. A fluid supply line fluidly couples the compressor section to the interior passage of at least one of the airfoils. A valve in the fluid supply line selectively controls a flow of fluid from the compressor section to the interior passage of the at least one of the airfoils.

In another aspect, the disclosure relates to a variable effective throat assembly for a turbine engine including a nozzle having a set of airfoils defining a throat between adjacent airfoils with at least one airfoil including an outer wall separating an interior of the airfoil from an exterior of the airfoil and including a set of exhaust holes between the interior and the exterior positioned downstream of the throat relative to a flow direction through the nozzle. A fluid supply line connects a source of fluid to the interior. A valve is provided in the fluid supply line for selectively controlling a flow of fluid from the source to the nozzle.

In yet another aspect, the disclosure relates to a method of varying flow capacity through a turbine engine. The method includes selectively supplying a flow of fluid to a set of airfoils in a nozzle wherein the flow of fluid is exhausted from each airfoil downstream of a throat defined between adjacent airfoils to effectively increase the flow through the throat.

DETAILED DESCRIPTION OF THE INVENTION

Aspects of the disclosure described herein are directed to a nozzle defining a throat for a turbine engine. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications. Similarly, while the aspects of the disclosure are described in relation to a nozzle for a first stage of a high-pressure turbine, the aspects of the disclosure can have equal applicability to a nozzle positioned anywhere in the high-pressure or low-pressure turbine, or a compressor, as well as rotating blades or any airfoil component for a turbine engine. Furthermore, the aspects can have applicability in any secondary air supply system, such as an inducer, accelerator or turbine on-boarding inducer, in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" when referring to a number of elements can include any number of elements, while a "set" as used herein when referring to airfoils includes any number being one or more.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
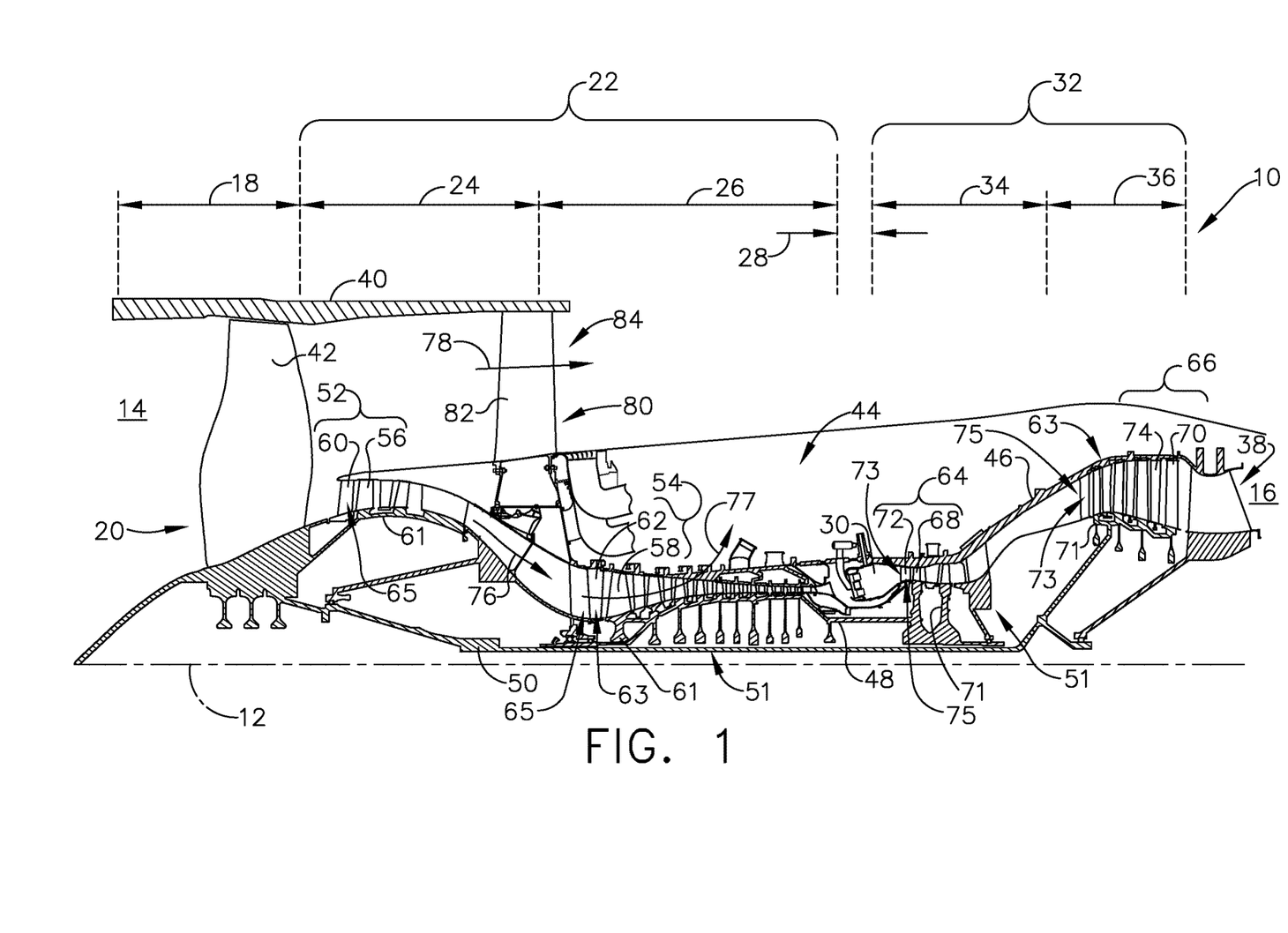
FIG. 1 is a schematic cross-sectional diagram of a gas turbine engine for an aircraft.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. Such spools 48, 50 are also contemplated in fixed shaft and geared connections. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62, also called a nozzle 73, to compress or pressurize the stream of fluid passing through the stage. A nozzle assembly 65 for the compressor section 22 can be formed as an annular set of nozzles or compressor vanes 60, 62, having a set or plurality of segments forming the annular nozzle assembly 65. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also called a nozzle 73, to extract energy from the stream of fluid passing through the stage. A turbine nozzle assembly 75 for the turbine section 32 can be formed as an annular set of nozzles or turbine vanes 72, 74, having a set or plurality of segments forming the annular nozzle assembly 75. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 exhausting from the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
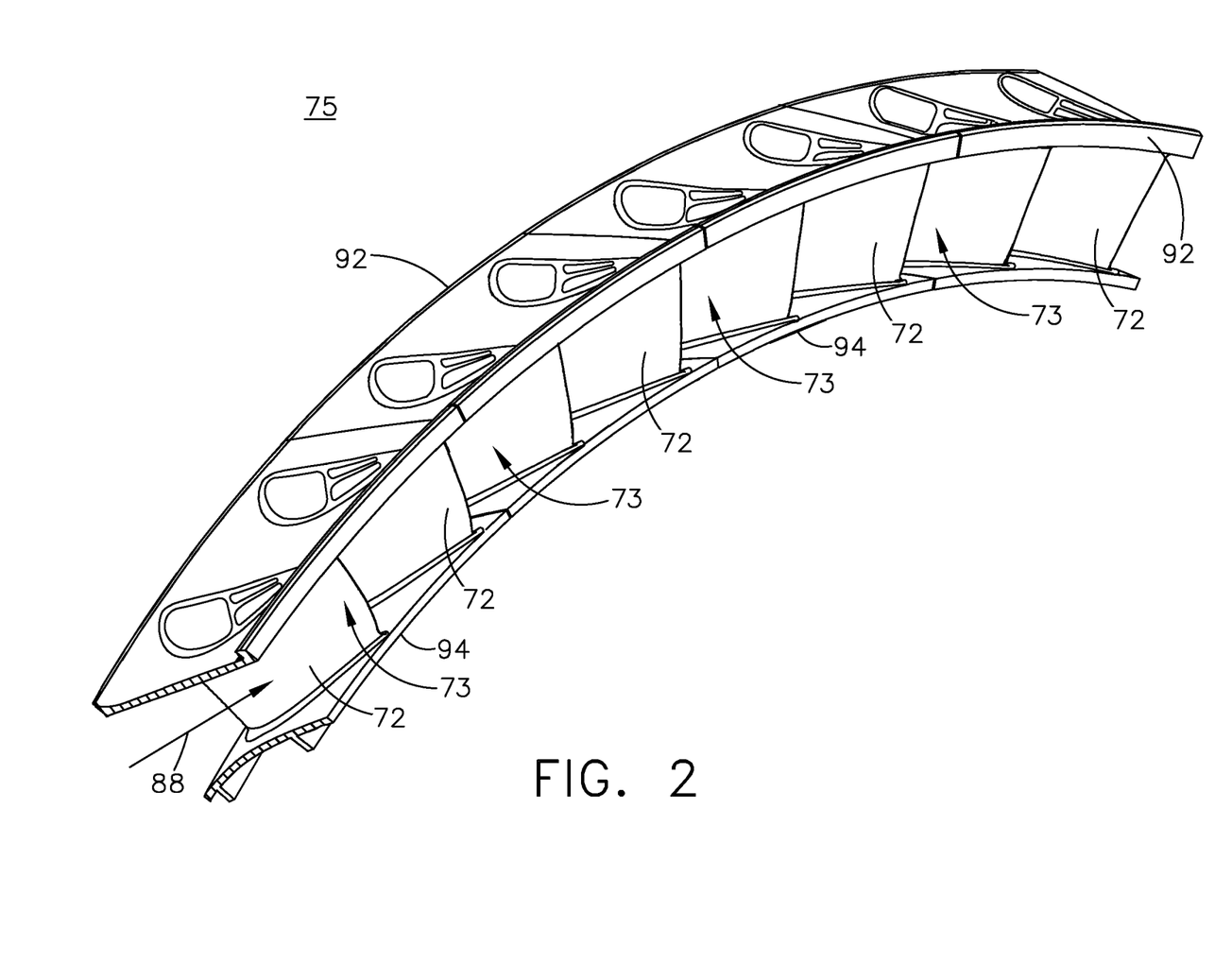
FIG. 2 is a view of a nozzle assembly provided in the gas turbine engine of FIG. 1.

Referring to FIG. 2, a portion of the nozzle assembly 75 includes a set of nozzles 73 in circumferential arrangement. The circumferential arrangement of nozzles 73 defines an annular organization for the nozzle assembly 75, which can be positioned around the engine centerline of FIG. 1. In one non-limiting example, the nozzle assembly 75 can be positioned within the first stage of the high pressure turbine 34 of FIG. 1, immediately downstream of the combustion section 28. Similarly, it should be understood that the nozzle assembly 75 can be positioned anywhere along the turbine section or compressor section of a turbine engine. Alternatively, the nozzle assembly could be positioned in the secondary cooling supply system, such as in an inducer, accelerator, or turbine on-boarding inducer. Each nozzle 73 includes an upper band 92 and a lower band 94, with two static vanes 72 extending between the upper and lower bands 92, 94. The nozzles 73, in non-limiting examples, can be uncooled nozzles without providing internal cooling from an exterior source, or subsonic nozzles adapted to operate under flow speeds less than the speed of sound. While only four nozzles 73 are illustrated, it should be understood that a plurality of nozzles 73 can be arranged to form the annular nozzle assembly 75. A flow path 88 can be defined for an airflow passing through the nozzle assembly 75, between the upper and lower bands 92, 94 and through the vanes 72. The annular geometry of the nozzle assembly 75 defined an annular cross-sectional area for the flow path 88.

Figure 3:
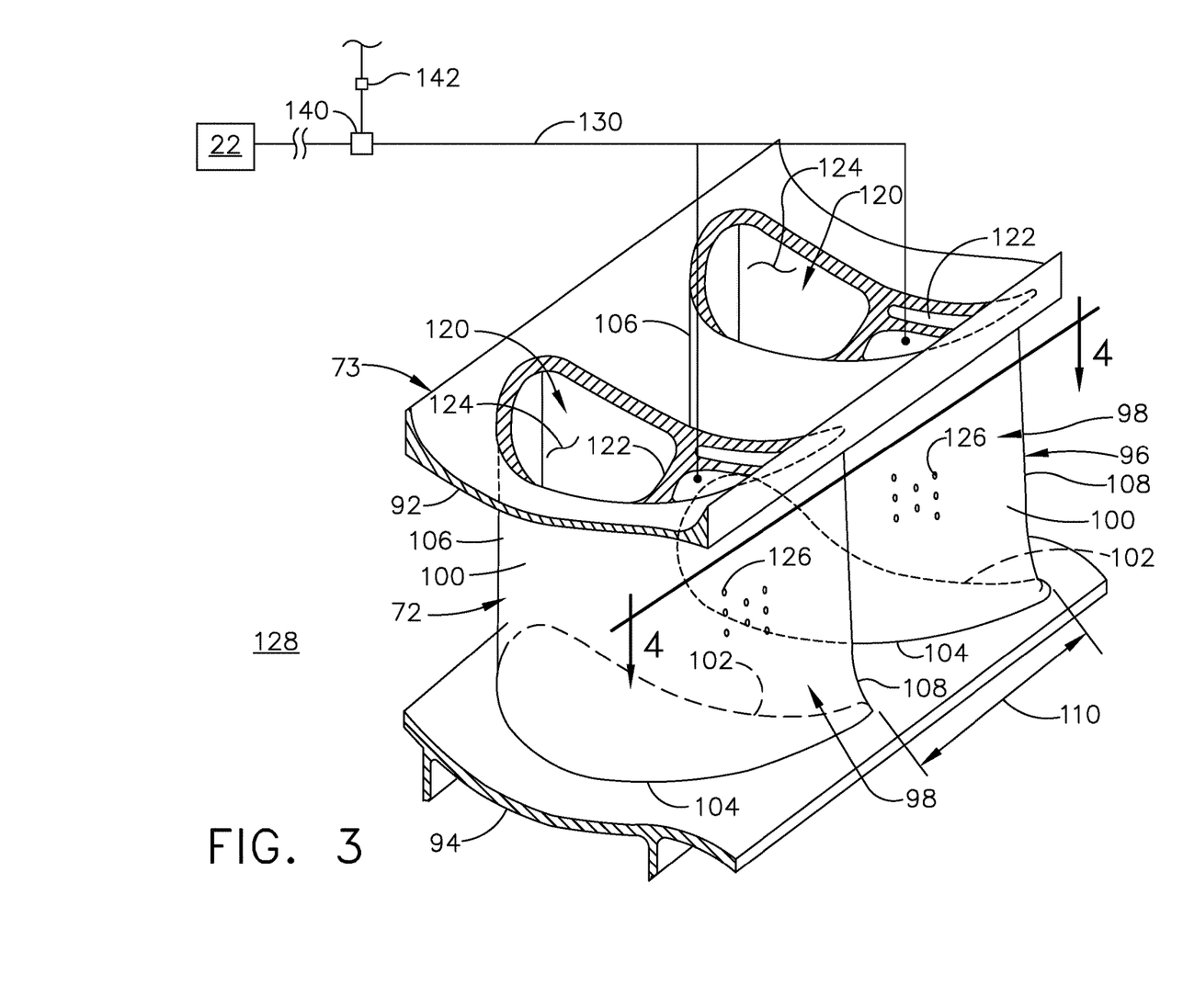
FIG. 3 is a perspective view of one nozzle of the nozzle assembly of FIG. 2 schematically coupled to a compressor section through a valve.

Referring to FIG. 3, one exemplary turbine nozzle 73 is shown including two vanes 72 that can be airfoils 98 having an outer wall 100 defining a pressure side 102 and a suction side 104, extending between a leading edge 106 and a trailing edge 108. While illustrated as two vanes 72 or airfoils 98 per nozzle 73, as a doublet arrangement, it should be appreciated that any number of airfoils 98 can be provided in the nozzle, such as one or more. Furthermore, while described in relation to static vanes 72 as the airfoils 98, aspects as described herein can have equal applicability to rotating blades, such as the blades 68, 70 of FIG. 1. The airfoils 98 are spaced from one another by a spacing gap 110. While the spacing gap 110 is illustrated between the trailing edges 108 of the airfoils 98, it should be understood that the spacing between airfoils 98 can vary based upon the variable thickness of the airfoils 98. The nozzles 73 are sized such that airfoils 98 on adjacent nozzles 73 are spaced from one another by the spacing gap 110, such that all airfoils 98 in an annular nozzle assembly are equally spaced from one another. In an alternative example, it is contemplated that the nozzle assembly may be unequally spaced, such that the spacing gap would be variable along the nozzle assembly.

An interior 120 for the airfoils 98 is defined by the outer wall 100. One or more interior structures, illustrated as ribs 122, can separate the interior 120 into interior passages 124. In one additional, non-limiting example, the interior structure can be an insert for the nozzle 73. While three interior passages 124 are illustrated, any number, combination, or geometry for the interior passages can be defined within the airfoil, as suitable to the particular airfoil 98 or nozzle 73. Furthermore, all airfoils 98 arranged in the nozzle 73 or the nozzle assembly 75 can be identical, while nozzles 73 among different engine stages or axial positions can vary. A set of exhaust holes 126 can be provided in the outer wall 100. The exhaust holes 126 can fluidly couple the interior 120 to an exterior 128 of each of the airfoils 98. In one non-limiting example, the exhaust holes 126 can be film hole providing a film along the exterior surface of the airfoil 98. It should be appreciated that the exhaust holes 126 need not be film holes, and can be any suitable aperture provided in the outer wall 100.

A fluid supply line 130 can fluidly couple the compressor section 22 to the interior 120 of the airfoils 98. In one non-limiting example, the fluid supply line 130 can supply a flow of bleed air to the airfoils 98, while other fluids or fluid supplies are contemplated. While illustrated schematically, the fluid supply line 130 can be a hollow conduit, permitting the passage of a fluid through the interior of the conduit. Similarly, the conduit can be fluidly coupled to the interior of the airfoils 98, for providing such a flow of fluid to the interior of the airfoils 98. The fluid supply line 130 can couple to one interior passage 124 positioned adjacent the suction side 104, where the exhaust holes 126 can fluidly couple the fluid supply line 130 to the exterior 128 of the airfoils 98. In such an example, the interior passage 124 can be fluidly sealed from the rest of the interior 120 of the nozzle 73 and the exterior 128 of the nozzle 73, except through the exhaust holes 126.

A valve 140 can be positioned along the fluid supply line 130. The valve 140 can be external of the nozzle 73. In one example, the valve 140 can be operably coupled to a controller 142 for selectively opening or closing the valve 140. The valve 140 can be actuable to selectively provide a flow of fluid to the nozzle 73 through the fluid supply line 130. For example, in an open position, the valve 140 can permit the flow of fluid to pass from the compressor section 22, to the nozzle 73, while in a closed position, the valve 140 prevents the flow of fluid to the nozzle 73.

Figure 4:
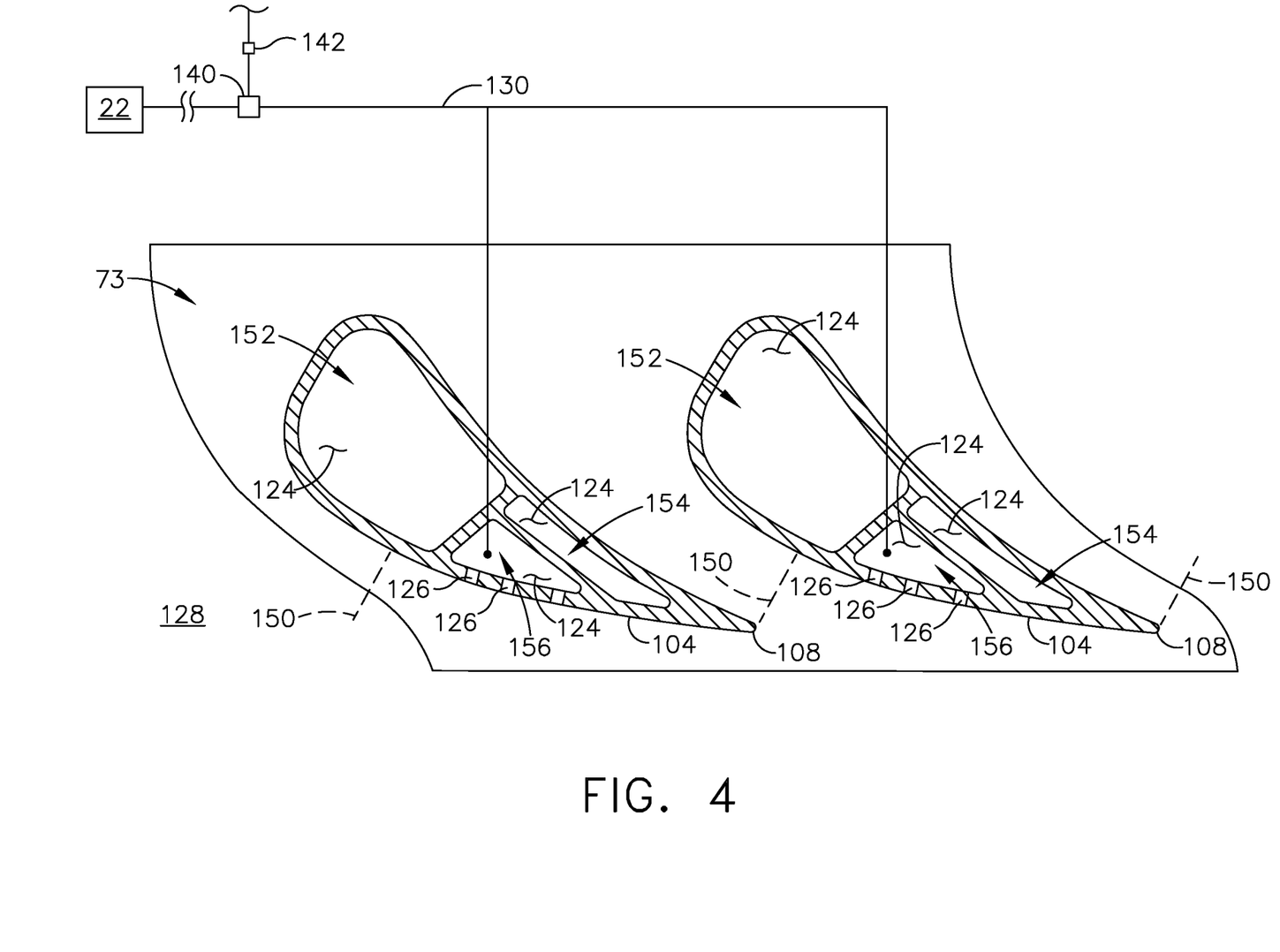
FIG. 4 is a section view of the nozzle of FIG. 3 taken along section 4-4 of FIG. 3, illustrating a throat.

Referring now to FIG. 4, a throat 150 can be defined between the airfoils 98 as the shortest distance between the airfoils 98. Commonly, the throat 150 is defined between the suction side 104 of one airfoil 98 and the trailing edge 108 of the adjacent airfoil 98, as is illustrated, while it is contemplated that the throat 150 can be defined at any position between the airfoils 98, so long as it is the shortest distance between them. The interior passages 124 can be defined as a leading edge passage 152, a trailing edge passage 154, and a suction side passage 156. The exhaust holes 126 are provided in the suction sidewall 104 fluidly coupling the suction side passage 156 to the exterior 128 of the nozzle 73. Additionally, the exhaust holes 126 can be positioned downstream of the throat 150. Furthermore, it is contemplated that the exhaust holes 126 can be positioned upstream of the trailing edge 108. Further still, it is contemplated that the exhaust holes can be positioned centrally between the throat 150 and the trailing edge 108, equidistant from the two. In yet another example, the exhaust holes can be positioned centrally between the root and the tip of the airfoil 98. The suction side passages 156 can be fluidly isolated from the remainder of the passages 152, 154 and the rest of the interior 120 of the nozzle 73. The fluid supply line 130 fluidly couples to the suction side passages 156 to exhaust a fluid through the exhaust holes 126, downstream of the throat 150. As such, the fluid supply line 130, the valve 140, and any interconnected components connected to the suction side passages 156 can be fluidly isolated from the remainder of the nozzle 73.

Figure 5:
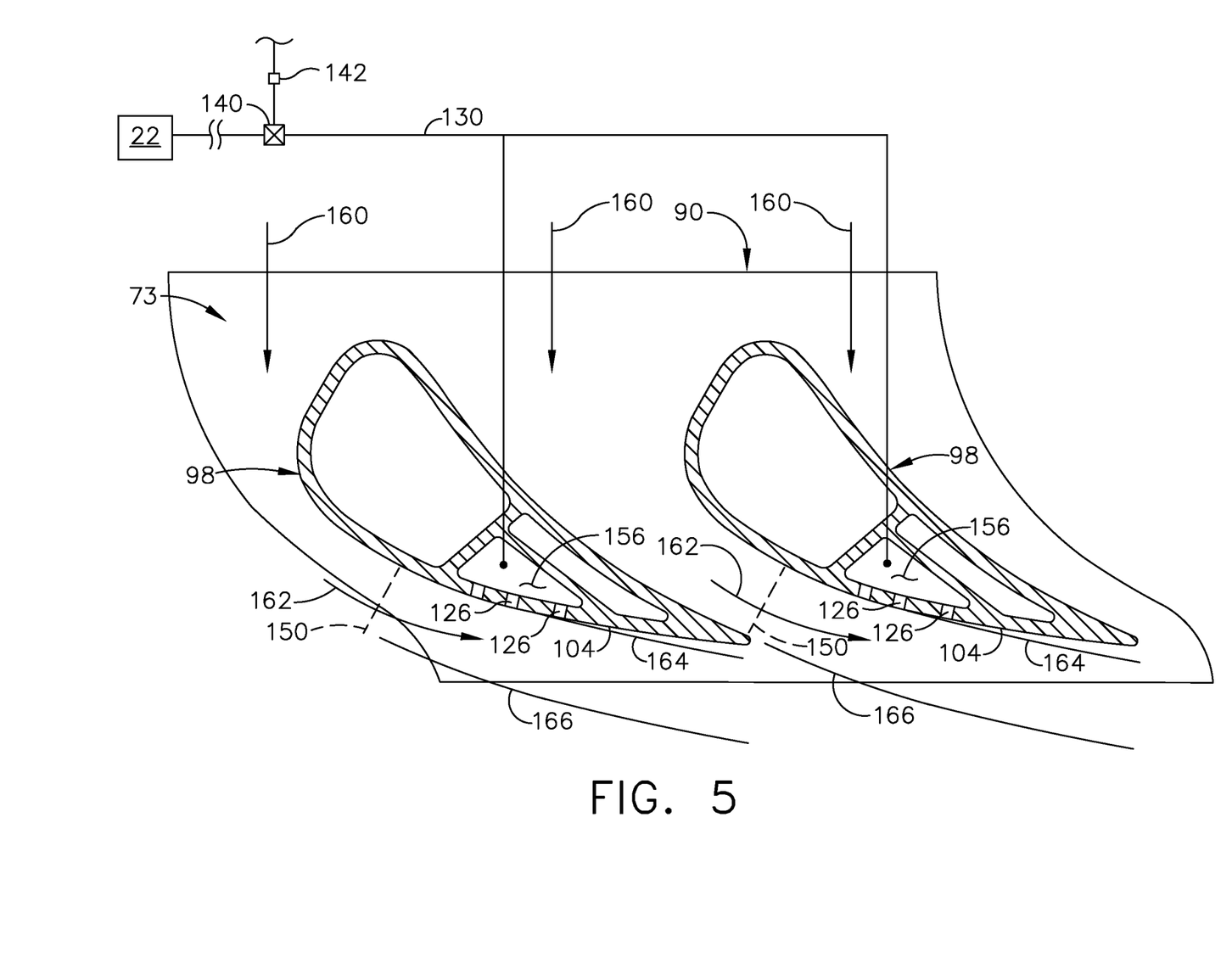
FIG. 5 is a section view of the nozzle of FIG. 4 illustrating a flow passing through the throat.

Referring now to FIG. 5, during operation of an engine containing the nozzle 73, a mainstream flow 160 can be provided to the nozzle 73. The mainstream flow 160 can travel in substantially the axial direction through the engine and the nozzle 73. In one non-limiting example, the mainstream flow 160 can have a helical component, wherein the mainstream flow 160 is circumferentially rotating about an engine center and travelling in an axial direction. A streamline flow 162 can be defined through the nozzle 73 between the airfoils 98, turning the mainstream flow 160 as it passes through the nozzle 73. A boundary layer 164 can form along the suction side 104 of the airfoils 98 and a streamline edge 166 can be spaced from the boundary layer 164 representative of the mainstream flow streamline flow 162 exhausting from the throat 150. The boundary layer 164 is present along the suction side 104 and provides a small amount of blockage at the throat 150, forming an effective throat that is slightly narrower than the physical throat 150. The effective throat limits flow capacity through the engine, and therefore limits the power and thrust generated by the engine. The size of the throat 150 is set by balancing operability, such as staying with proper stall margins, with efficiency, which can increase by narrowing the throat 150. As such, the narrowed throat resultant of the boundary layer can negatively impact engine operation. Conditions such as stall margins and flow disturbances or flow attachment through the nozzle 73 limit the size of the throat 150. The nozzle 73 must not permit too small of a flow volume or too great of a flow volume otherwise the engine may stall or run inefficiently. As such, the throat is sized based upon these limitations in attempt to remain within stall margins while maximizing efficiency. However, different operational conditions have different needs of the engine. Such single throat geometry is not tailored to the differing needs of the varying operational conditions the engine requires during operation.

As shown in FIG. 5, the valve 140 is closed, such that a restricted amount of fluid from the fluid supply line 130 is provided to the suction side passage 156. Therefore, only a small amount, or no amount of flow exits through the exhaust holes 126 and the effective throat is sized solely upon the physical geometry of the nozzle 73 and the boundary layer 164 along the suction side 104. In this condition, the flow passing through the nozzle 150 is set by a relationship between the inlet pressure of the mainstream flow 160, the pressure and diluted temperature at the throat 150, and the size of the effective throat narrowed by the boundary layer 164. The throat pressure 150 is determined by the geometry of the nozzle 73 and the pressure of the streamline flow 162 downstream of the throat 150, which is determined by the remainder of the engine downstream of the nozzle 73. The relationship between the pressure at the throat 150 and the pressure of the streamline flow 162 downstream of the throat 150 is known as pressure recovery, with the flow diffusing and resulting in increasing pressure downstream of the throat 150 and the nozzle 73.

In a case of rotating blades, or other similar elements such as an inducer or accelerator, a throat can be defined between adjacent blades or similar elements defining a throat. In such a case, an interior passage can be fluidly coupled to an external valve to modulate a flow of fluid to the blades or similar elements.

Figure 6:
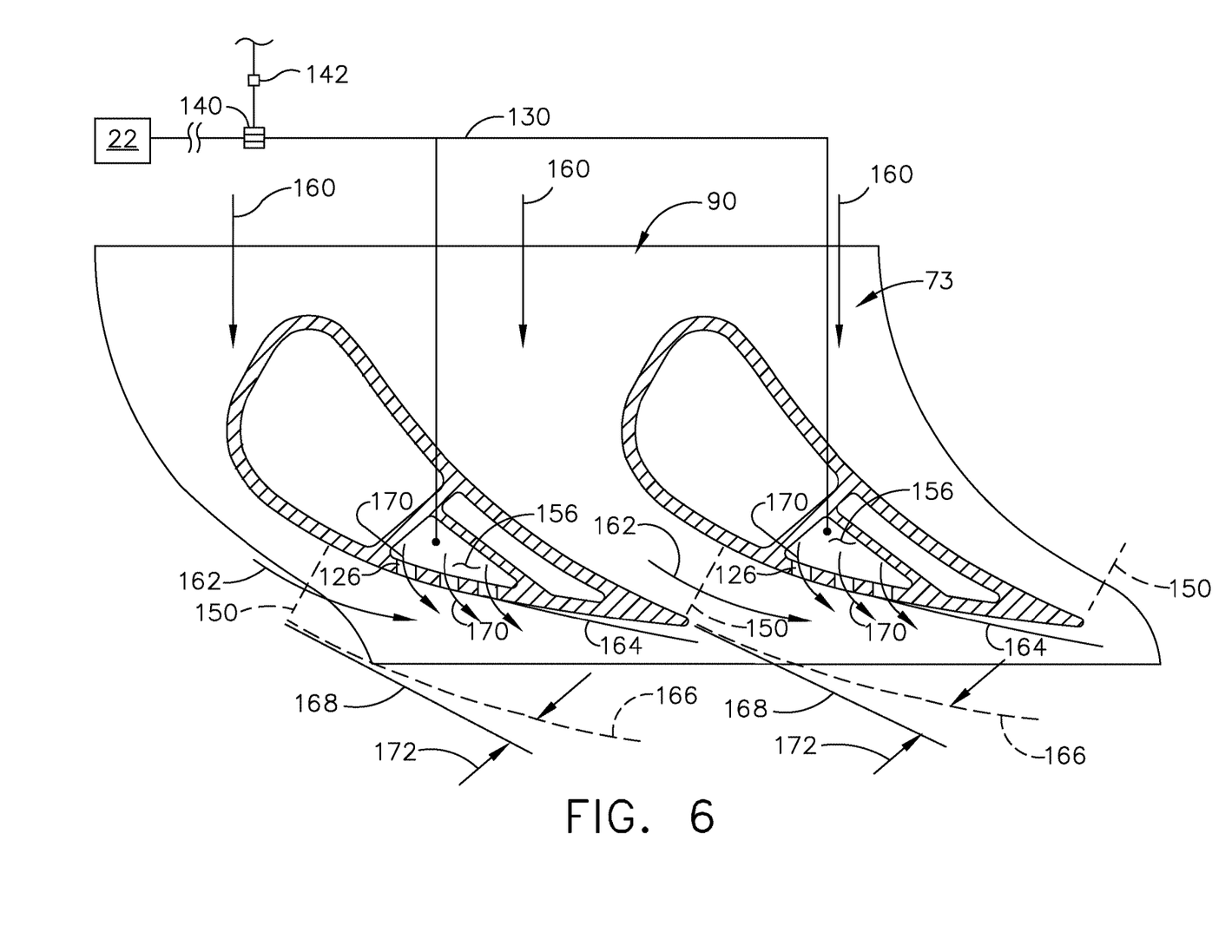
FIG. 6 a section view of the nozzle of FIG. 4 illustrating a cooling flow exhausting from the nozzle downstream of the throat.

Referring now to FIG. 6, the valve 140 is in an opened position providing a flow of fluid along the fluid supply line 130 to the suction side passage 156 where a flow of fluid 170 can exit from the suction side passage 156 through the exhaust holes 126, downstream of the throat 150. The flow of fluid 170 exiting from the exhaust holes 126 alters the course of the streamline edge 166 to a widened streamline edge 168, such that the streamline flow 162 widens at 172 in FIG. 6 as compared to the streamline flow 162 of FIG. 5 without the flow of fluid 170 exhausted from the exhaust holes 126.

As the streamline flow 162 expands to the widened streamline edge 168, the effective geometry of the diffused streamline flow 162 is changed and widened. Widening of the streamline flow 162 increases the rate of diffusion that occurs downstream of the throat 150. Since the pressure downstream of the throat 150 is controlled by the engine components downstream of the nozzle 73, the increased diffusion results in a decreased pressure at the effective throat 150. Flow through the throat 150 is governed by the pressure of the mainstream flow 160 entering the nozzle 73, the pressure and diluted temperature at the throat 150, and the effective throat defined by the boundary layer 164. As such, increasing the recovery downstream of the throat 150 by adding mass via the flow of fluid 170 from the exhaust holes 126 lowers the pressure at the throat 150 and increases the mass flow capacity of the throat 150, resulting in an effective variable throat. The effective variable throat can be controlled proportional to the flow of fluid 170.

The variability of the throat 150 can be proportionally controlled by selectively opening or closing the valve 140, or discretely controlling the flow rate through the valve 140. For example, when heightened operational demands for the engine is required during takeoff or acceleration, the valve 140 can be opened to effectively open the throat 150, permitting a greater flow capacity through the engine. When lesser operational demands are required, such as at idle or cruise, the valve 140 can be closed, to increase engine efficiency. Furthermore, the valve 140 can be tailored to allow multiple, variable amounts of fluid to the nozzle 73, and thus tailored to the particular needs of the particular operational condition of the engine. As such, the valve 140 could permit discrete flow rates, beyond just an opened and closed condition.

In the case of a set of blades defining a throat, an external valve, or a variable effective nozzle in a secondary air supply system, can modulate the flow to one or more blades to reduce the cooling flow to increase performance as needed, such as at cruise, or increase cooling flow for improve cooling during heightened operational demands, such as during takeoff and climb. In the case of the blades, the external valve can control the total cooling flow to the blades, and a balance between blade cooling and engine operability can be tailored to the present engine operational condition or needs. A set of holes similar to the exhaust holes 126 can be provided on the blade downstream of the throat defined between two adjacent blades to improve the control of the effective throat at the blades as the cooling is modulated. In the absence of the holes, a higher level of blade flow can decrease the effective throat, negatively affecting engine operability. Utilizing the holes downstream of the throat can offset this effect across a wide range of operational conditions.

The nozzle, valve, and exhaust holes as described provide for a variable effective throat that is mechanically controlled external of the nozzle. The variable effective throat provides for optimization of the engine for operability and efficiency across a range of operational states or conditions. Additionally, the variable effective throat provides for balancing increased flow rates during heightened operational requirements with efficiency requirements for the engine, while minimizing engine complexity and minimizing flow disturbances. Providing the flow of fluid downstream of the nozzle results in minimal losses at the low flow capacity point. Furthermore, the exhausted flow operates as a cooling film across portions of the nozzle, providing for increased operational temperatures capability in the nozzle when the exhaust flow is increased for takeoff or acceleration. Use of such a variable effective throat can be beneficial in varying the engine throat in subsonic implementations.

A method of varying flow capacity through a turbine engine can include selectively supplying a flow of fluid from an airfoil in a nozzle downstream of a throat defined by the nozzle. For example, the valve as described herein can be used to selectively supply a flow of fluid to an internal passage of an airfoil in the nozzle, where the flow of fluid can be supplied downstream of the throat in the nozzle from one or more exhaust passages.

Additionally, the method can include selectively supplying the flow of fluid by actuating a valve, such as the valve 140 as described herein. The method can further include exhausting the flow of fluid from an exhaust hole in the airfoil. The exhaust hole can be a film hole, in one example.

It should be appreciated that application of the disclosed design is not limited to turbine engines with fan and booster sections, but is applicable to turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   a compressor section and a combustion section in axial flow arrangement and defining an engine centerline;
   a nozzle assembly downstream of the combustion section, and having a set of airfoils circumferentially arranged around the engine centerline, with a throat defined between adjacent airfoils as the shortest physical distance between the adjacent airfoils, at least one of the airfoils having an interior passage and a set of exhaust holes from the interior passage positioned downstream of the throat with none of the set of exhaust holes positioned upstream of the throat;
   a fluid supply line fluidly coupling the compressor section to the interior passage of the at least one of the airfoils; and
   a valve in the fluid supply line selectively controlling a flow of fluid from the compressor section to the interior passage of the at least one of the airfoils;
   wherein emitting the flow of fluid from the set of exhaust holes downstream of the throat effectively increases an area of the throat.

2. The turbine engine of claim 1 wherein the set of airfoils include a pressure side and a suction side, and the set of exhaust holes is positioned on the suction side.

3. The turbine engine of claim 2 wherein the set of exhaust holes includes an inlet at the interior passage and an outlet on the suction side.

4. The turbine engine of claim 3 wherein the set of exhaust holes is positioned upstream of a trailing edge.

5. The turbine engine of claim 4 wherein the set of exhaust holes is positioned centrally between the throat and the trailing edge.

6. The turbine engine of claim 1 wherein the fluid supply line fluidly couples the compressor section to the at least one airfoil.

7. The turbine engine of claim 1 wherein the turbine engine further includes a turbine section having a high pressure turbine and the nozzle assembly is positioned at a first stage of the high pressure turbine.

8. The turbine engine of claim 1 wherein the nozzle assembly includes a plurality of nozzles.

9. The turbine engine of claim 8 wherein each nozzle includes two airfoils.

10. The turbine engine of claim 9 wherein the plurality of nozzles are spaced to further define the throat between airfoils of adjacent nozzles to be equal to the throat between airfoils on the same nozzle.

11. The turbine engine of claim 8 wherein the plurality of nozzles are subsonic nozzles.

12. The turbine engine of claim 1 wherein the airfoils are stationary vanes.

13. The turbine engine of claim 1 wherein the valve is actuable to open to effectively increase the throat.

14. The turbine engine of claim 1 wherein the valve is external to the nozzle assembly.

15. A variable effective throat assembly for a turbine engine having a mainstream flow, the variable effective throat assembly comprising:
   a set of airfoils defining a throat as the shortest physical distance between adjacent airfoils, with at least one airfoil including an outer wall separating an interior of the airfoil from an exterior of the airfoil and including a set of exhaust holes in the outer wall positioned downstream of the throat relative to a flow direction through the throat;
   a fluid supply line connected to the interior; and
   a valve in the fluid supply line for selectively controlling a flow of fluid to the interior;
   wherein no exhaust holes of the set of exhaust holes are positioned upstream of the throat, and wherein the flow of fluid provided from the set of exhaust holes increases a rate of flow diffusion for the mainstream flow downstream of the throat, which decreases a pressure at the effective throat, resulting in an effective variable throat at the throat having an increased flow capacity through the throat.

16. The variable effective throat assembly of claim 15 wherein the airfoils include a pressure side and a suction side, and the set of exhaust holes is positioned on the suction side.

17. The variable effective throat assembly of claim 16 wherein the airfoils include an interior passage fluidly coupled to the fluid supply line.

18. The variable effective throat assembly of claim 17 wherein the exhaust hole includes an inlet at the interior passage.

19. The turbine engine of claim 16 wherein the set of exhaust holes is positioned upstream of a trailing edge.

20. The turbine engine of claim 19 wherein the set of exhaust holes is positioned centrally between the throat and the trailing edge.

21. The variable effective throat assembly of claim 15 wherein the set of airfoils are positioned at a first stage of a high pressure turbine.

22. The variable effective throat assembly of claim 15 wherein the set of airfoils includes a set of rotating blades.

23. The variable effective throat assembly of claim 15 wherein the set of airfoils includes a set of stationary vanes.

24. A method of varying flow capacity through a turbine engine, the method comprising:
   selectively supplying a flow of fluid to an interior of an airfoil;
   exhausting, through a set of exhaustion holes in the airfoil, the flow of fluid from the airfoil downstream of a throat defined as the shortest physical distance between the airfoil and an adjacent airfoil, wherein exhausting the flow of fluid from the interior of the airfoil downstream of the throat effectively increases the flow capacity through the throat;

wherein no portion of the flow of fluid exhausted from the set of exhaust holes is provided upstream of the throat.

25. The method of claim 24 wherein selectively supplying the flow of fluid further includes actuating a valve.

26. The method of claim 25 wherein the set of exhaust holes is provided in a suction side of the airfoil, downstream of the throat, and upstream of a trailing edge.

* * * * *